United States Patent
Littmann

[11] 3,715,931
[45] Feb. 13, 1973

[54] GEAR MOUNTED DRIVE ARM ADAPTED TO FLEX AS CANTILEVER BEAM

[75] Inventor: Joseph C. Littmann, Temperance, Mich.

[73] Assignee: Dura Corporation, Toledo, Ohio

[22] Filed: April 19, 1971

[21] Appl. No.: 135,047

[52] U.S. Cl. ..........................74/411, 49/342, 49/350
[51] Int. Cl. ..........................F16h 57/00, E05f 11/24
[58] Field of Search ...........74/411; 49/342, 349, 350

[56] References Cited

UNITED STATES PATENTS

| | | | |
|---|---|---|---|
| 3,088,727 | 5/1963 | Pelagatti | 74/411 X |
| 2,848,218 | 8/1958 | Leslie et al. | 49/349 |
| 2,793,907 | 5/1957 | Hess et al. | 49/349 X |
| 2,777,688 | 1/1957 | Ehrlich et al. | 49/349 X |

Primary Examiner—Leonard H. Gerin
Attorney—Malcolm W. Fraser

[57] ABSTRACT

A vehicle window regulator drive arm, or the like is, mounted on the pivot pin of a power driven gear sector. An integral extension is on the inner end of the drive arm, the end of which has a pin and slot connection with the gear sector. The arm extension is shaped to provide flexure without stress risers and flex like a cantilever beam about the pivot pin. The pin and slot connection affords the movement necessary as the drive arm foreshortens while flexing.

6 Claims, 2 Drawing Figures

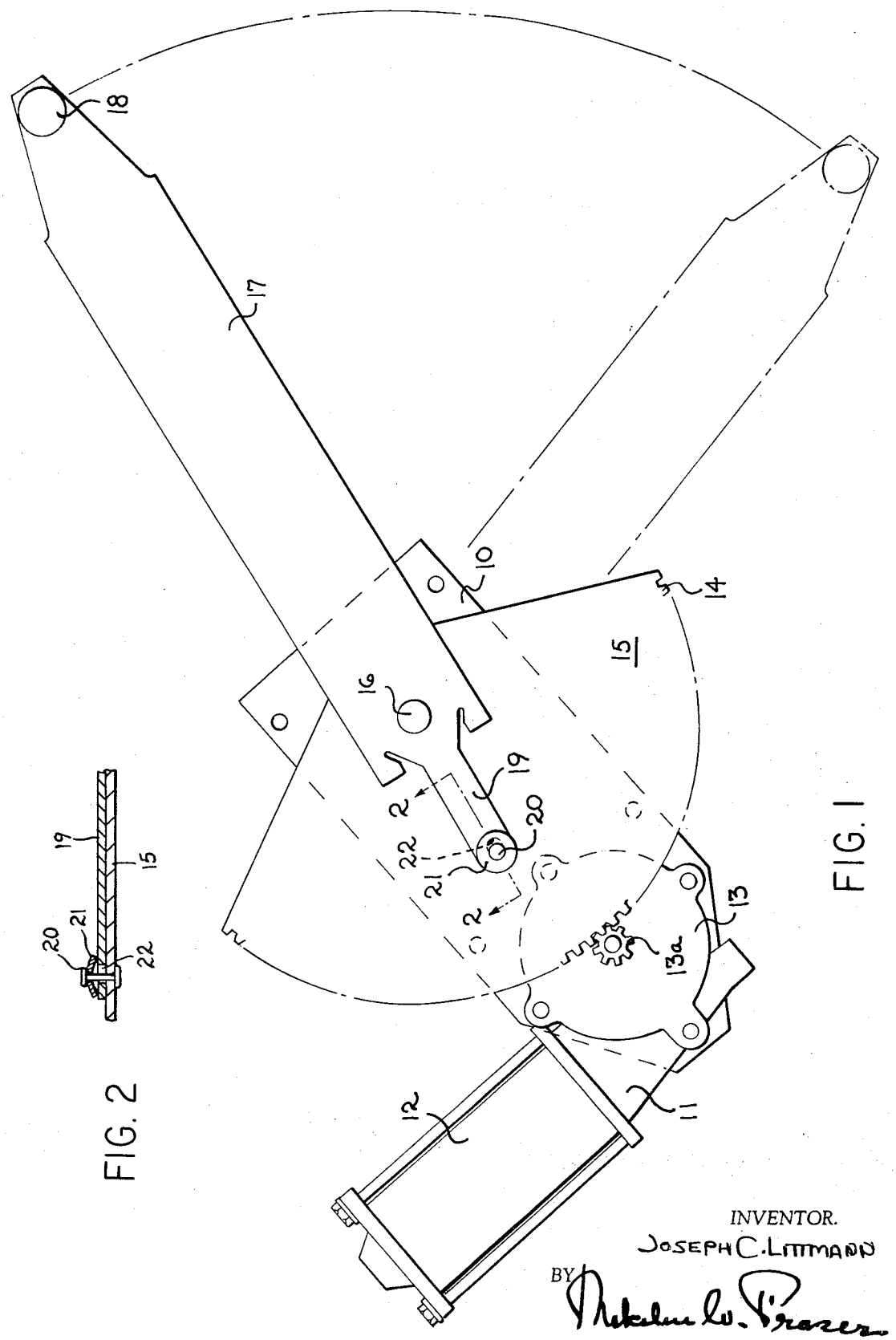

GEAR MOUNTED DRIVE ARM ADAPTED TO FLEX AS CANTILEVER BEAM

BACKGROUND OF THE INVENTION

In electric motor driven window regulators, the motor drives a gear sector through reduction gearing, which usually incorporates an overload release device or coupling for preventing damage to the parts in the event the switch was not released when the window had reached its limit of movement. One device of this character, which is extensively used, is shown in U.S. Pat No. 3,554,045 granted Jan. 12, 1971. Fixed to the gear sector in such assembly is a drive arm, which operatively engages the window panel for effecting opening and closing movements thereto. Such overload release devices operate satisfactorily, but they are relatively expensive and add substantially to the cost of the assembly. It is a desideratum to provide a simpler and less expensive solution to this problem.

SUMMARY OF THE INVENTION

The drive arm which is rocked in one direction or the other in response to gear sector movement is not connected to the gear sector in the usual manner. Ordinarily the drive arm is fixed to the gear sector so as to move as a unit with the sector. In this instance a flexing member is incorporated in the drive arm as an integral part thereof. The arm engages the pivotal axis of the gear sector but is not fixed at this point for movement with the sector. An extension of the arm is so designed as to flex as a cantilever beam about the sector axis, so that when required a limited flexure of the arm takes place for relieving stress on other parts. The end of such arm extension has a lost motion connection with the gear sector to afford the movement necessary as the drive arm foreshortens during flexing.

BRIEF DESCRIPTION OF THE DRAWINGS

FIG. 1 is a plan view of a vehicle window regulator mechanism; and

FIG. 2 is a sectional view substantially on the line 2—2 of FIG. 1.

DESCRIPTION OF PREFERRED EMBODIMENT

The illustrated embodiment of the invention comprises a sheet metal mounting plate 10 for a vehicle window regulator mechanism, such as is mounted in the door of an automobile for raising and lowering the window panel. The plate 10 is provided with a lateral bracket for supporting a reversible electric motor 12 which is connected through suitable reduction gear transmission to drive a pinion 13a. The pinion 13a meshes with teeth in an arcuate row of teeth on a stamped sheet metal gear sector 15 for driving it in one direction or the other dependent upon the direction of rotation of the electric motor 12. The sector 15 rotates about a rivet pin 16 on the mounting plate 10 which is coaxial with the arcuate row of teeth.

Projecting outwardly beyond the gear sector 15 on the side opposite the row of teeth 14 is a drive arm 17. On the outer end of the drive arm 17 is a button 18 which is adapted to travel in a channel fixed to the lower edge of a window panel (not shown) for effecting raising and lowering movements thereof, as will be readily apparent to those skilled in this art. The drive arm 17 engages the rivet pin 16 which retains the arm in place and about which the arm can flex when the regulator is subjected to stress, such for example as where the switch controlling the motor 12 has been left on after the window panel has reached a limit of movement.

The end portion 19 of the drive arm beyond the rivet pin 16 is reduced in width or so shaped as to provide flexure without stress risers and flex as a cantilever beam about the sector pivot pin 16.

The outer end of the arm extension 19 is attached to the gear sector 15 by a rivet 20 having a bellville washer spring 21. In the extension 19 is an elongate hole 22 through which the rivet 20 extends. Thus, the arm extension 19 has a constantly secure attachment to the gear sector without loosening throughout the normal operational life of the mechanism. The hole 22 enables drive arm travel necessary as the arm foreshortens while flexing.

The flexing portions of the drive arm preferably are induction heated and quenched from SAE. 1030 to provide a surface hardness for the increased tensile stress attained during bending. It is found that an approximately 2° flexure of the drive arm is equivalent to about a thirty degree flexure on couplings, such as heretofore interposed in the drive transmission from the electric motor.

What I claim is:

1. In a device of the class described, a gear mounted for rotary movement about a fixed axis, power operating means engaging said gear for imparting movement thereto, a drive arm having a free outer end for preforming useful work and having an inner end portion engaging the gear at the axis, and extending therebeyond, said extending portion being adapted to flex relative to the remainder of said arm, and a lost motion connection between the end of said extending portion and said gear to provide movement necessary as the arm foreshortens while flexing.

2. In a device of the class described as claimed in claim 1, in which said arm flexes as a cantilever beam about said gear axis.

3. In a device of the class described as claimed in claim 1, in which said lost motion connection comprises a rivet connection, there being an elongate slot in the arm extension through which said rivet projects.

4. In a device of the class described as claimed in claim 3, comprising a bellville washer spring on said rivet for effecting a secure attachment between the arm extension and said gear.

5. In a device of the class described as claimed in claim 1, in which said arm extension comprises an integral arm portion of less dimension than the rest of the arm to enable flexure thereof relative to the rest of the arm.

6. In a device of the class described as claimed in claim 5, in which said integral arm portion is of the order of one third the width of the remaining portion of the arm and is surface hardened to afford increased tensile stress during flexing.

* * * * *